United States Patent
Tran et al.

(10) Patent No.: US 8,643,662 B2
(45) Date of Patent: Feb. 4, 2014

(54) VIDEO ENTERTAINMENT PICTURE QUALITY ADJUSTMENT

(75) Inventors: Dang Van Tran, Laguna Nigel, CA (US); Esther Zheng, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 748 days.

(21) Appl. No.: 12/428,317

(22) Filed: Apr. 22, 2009

(65) Prior Publication Data

US 2010/0271390 A1 Oct. 28, 2010

(51) Int. Cl.
G09G 5/00 (2006.01)
G09G 5/02 (2006.01)
G06K 9/00 (2006.01)
G06K 9/40 (2006.01)
G06K 9/60 (2006.01)
G06F 15/16 (2006.01)
H04N 5/58 (2006.01)
H04N 5/57 (2006.01)

(52) U.S. Cl.
USPC ........... 345/581; 345/589; 345/600; 345/601; 382/162; 382/254; 382/305; 709/203; 709/219; 348/602; 348/687

(58) Field of Classification Search
USPC .......... 345/589, 600–602, 617, 581; 348/649, 348/655, 673, 678, 679, 687, 602, 603; 709/201, 203, 217, 219; 382/162, 167, 382/254, 274, 305
See application file for complete search history.

(56) References Cited

U.S. PATENT DOCUMENTS

| | | | | |
|---|---|---|---|---|
| 6,008,836 A * | 12/1999 | Bruck et al. | ................. | 725/131 |
| 6,618,045 B1 * | 9/2003 | Lin | ............................. | 345/207 |
| 2005/0229200 A1* | 10/2005 | Kirkland et al. | ................ | 725/12 |
| 2007/0165048 A1* | 7/2007 | Yamashita et al. | ............ | 345/601 |
| 2008/0218501 A1* | 9/2008 | Diamond | ....................... | 345/207 |
| 2008/0238931 A1* | 10/2008 | Komiya et al. | ............... | 345/589 |
| 2008/0313230 A1* | 12/2008 | Karaoguz et al. | .......... | 707/104.1 |
| 2009/0138805 A1* | 5/2009 | Hildreth | ........................ | 715/745 |
| 2009/0219442 A1* | 9/2009 | Hironaka et al. | ............. | 348/687 |
| 2009/0273661 A1* | 11/2009 | Mauchly | .................... | 348/14.08 |

* cited by examiner

Primary Examiner — Wesner Sajous
Assistant Examiner — Andrew Shin
(74) Attorney, Agent, or Firm — Kenneth L. Sherman, Esq.; Michael Zarrabian, Esq.; Sherman & Zarrabian LLP

(57) ABSTRACT

A system and method for dynamically changing the display parameters of a display device. The system includes a server that obtains information about display content, environmental factors and user preferences affecting the display device. This information is used to generate initial display parameters which can be downloaded to the display device. The display device can use the initial display parameters to select final display parameters based upon sensed real-time information about the display device, the user preferences and environmental factors affecting the display device.

36 Claims, 6 Drawing Sheets

VIDEO ENTERTAINMENT PICTURE QUALITY ADJUSTMENT

BACKGROUND OF THE INVENTION

1. Field of the Invention

The invention relates to video entertainment systems and, in particular, concerns a global system that provides viewing parameters to a plurality of different video entertainment devices, such as televisions, Blu-ray players, digital picture frames, and the like and further allows the video entertainment devices to transmit data about the environment in which the device is placed and user preferences to allow for improved viewing parameters to be developed for the individual device.

2. Description of the Related Art

Entertainment systems, including televisions, video monitors and the like are becoming increasingly more sophisticated. High definition video content is now provided on many cable and satellite systems and future entertainment content will have increasingly higher definition resolution. Such high definition resolution substantially improves the quality of the video entertainment.

As video content is becoming increasingly higher resolution, configuring the video entertainment display parameters to achieve a desired level of quality becomes more complicated. The best viewing parameters for particular video content may be dependent on a wide variety of factors. These factors include the environment in which the display device is positioned and the lighting in the room at the time the content is being displayed. Other factors can include user preferences as different users may prefer content to have different display parameters. Further, characteristics of the particular content may also comprise factors that affect the quality of the content being displayed.

Often, the factors that affect the quality of the displayed content are dependent upon what individual viewers prefer. It may be that viewers who have previously seen particular content may have determined a preference for some or all of the display parameters that can be beneficial to subsequent viewers. Alternatively, the creators of the content may also have input on the desired viewing parameters. However, current systems are generally not capable of allowing subsequent viewers to receive beneficial input from previous viewers or content creators.

Further, current systems are generally not capable of dynamically adjusting the display parameters to match the environmental or personal factors for various viewers. Typically, a viewer sets the display parameters, e.g., brightness, contrast, sharpness, color, tint, color temperature, gamma value, etc., when the video display is installed. Given the number of different parameters, viewers will often not adjust the parameters to accommodate different and/or changing viewing environments, e.g., changes in light level in the room, or differences in the content. As such, current video display systems generally fail to dynamically maintain an improved viewing experience for the viewers.

As such, there is a need for a video display system that can more automatically update the viewing parameters of an individual display. To this end, there is a need for a system that is capable of downloading preferred viewing parameters to one or more individual video displays so that the video displays can adjust their display parameters to provide a better display characteristic. Further, there is a need for a system that can dynamically provide data indicative of the viewing environment or viewer preferences so that the system can provide updated parameters with the actual viewing environment for the individual display device in mind.

SUMMARY OF THE INVENTION

The aforementioned needs are satisfied by embodiments that can include a server that is adapted to communicate with a plurality of video display devices that are distributed into a plurality of different locations. The server can be adapted to receive signals from the distributed display devices indicative of the environment in which the display devices are positioned and/or signals indicative of the user's preferences. The server can also be adapted to provide signals to one or more of the distributed video display devices that provide configuration information for content that can be displayed by the one or more plurality of video display devices. In one implementation, the information provided by the at least one server is selected at least in part based upon the information that is provided to the at least one server from the plurality of distributed display devices indicative of the environment in which the display devices are situated and/or the user's preferences.

In one exemplary implementation, at least one of the display devices is initially set up with default settings. Environmental factors, such location, lighting, viewing distance, viewing location, etc. are communicated to the at least one server and the at least one server provides a set of initial display parameters. In one specific exemplary implementation, the initial display parameters can be provided in look-up table form. These initial display parameters allow the display device to dynamically tune the display to the recommended parameters.

In one exemplary implementation, the at least one server determines preferred initial parameters for particular video content. When this particular video content is being displayed by a selected video display device, the at least one server downloads the preferred initial parameters so that the display device can adjust the display parameters for that device based at least in part upon the preferred initial parameters.

Embodiments allow for dynamically adjusted display parameters that can vary based upon a variety of factors including, but not limited to, the display environment, the user preferences and determined preferred parameters specific to the video content being displayed. As this information is being determined dynamically, the user involvement in setting display parameters is reduced.

One embodiment includes a system for displaying graphic content via one or more display devices, the system comprising at least one server that is communicatively linked to at least one display device, wherein the at least one server provides initial display parameters to the at least one display device and one or more picture quality generators that are respectively associated with the one or more display devices, wherein the picture quality generators receive the initial display parameters and implement final display parameters based upon the initial display parameters and dynamic factors affecting the respective display device.

Another embodiment includes a system for displaying graphic content, the system comprising a server having access to data indicative of selected graphic content to be displayed, wherein the server generates initial display parameters based, at least in part, upon the selected graphic content data and one or more display devices wherein the one or more display devices are communicatively linked with the server so as to receive the initial display parameters, and wherein the one or more display devices further are communicatively linked with an environment monitor wherein the one or more display devices select a final set of display parameters based upon the initial display parameters provided by the server and input from the environment monitor and wherein the one or more display devices adjust display settings of the display device based on the final set of display parameters for display of the selected content.

A further embodiment includes a method of displaying graphic content via a display device, the method comprising developing initial display parameters tailored for selected graphic content, providing the initial display parameters to the display device, automatically monitoring an environment in which the display device is currently positioned, automatically calculating final display parameters based upon the initial display parameters and based upon the monitored environment in which the display device is currently positioned, automatically implementing the final display parameters on the display device and displaying the graphic content according to the final display parameters. These and other objects and advantages will become more apparent from the following description taken in conjunction with the accompanying drawings.

DETAILED DESCRIPTION OF ONE EMBODIMENT

Figure 1:
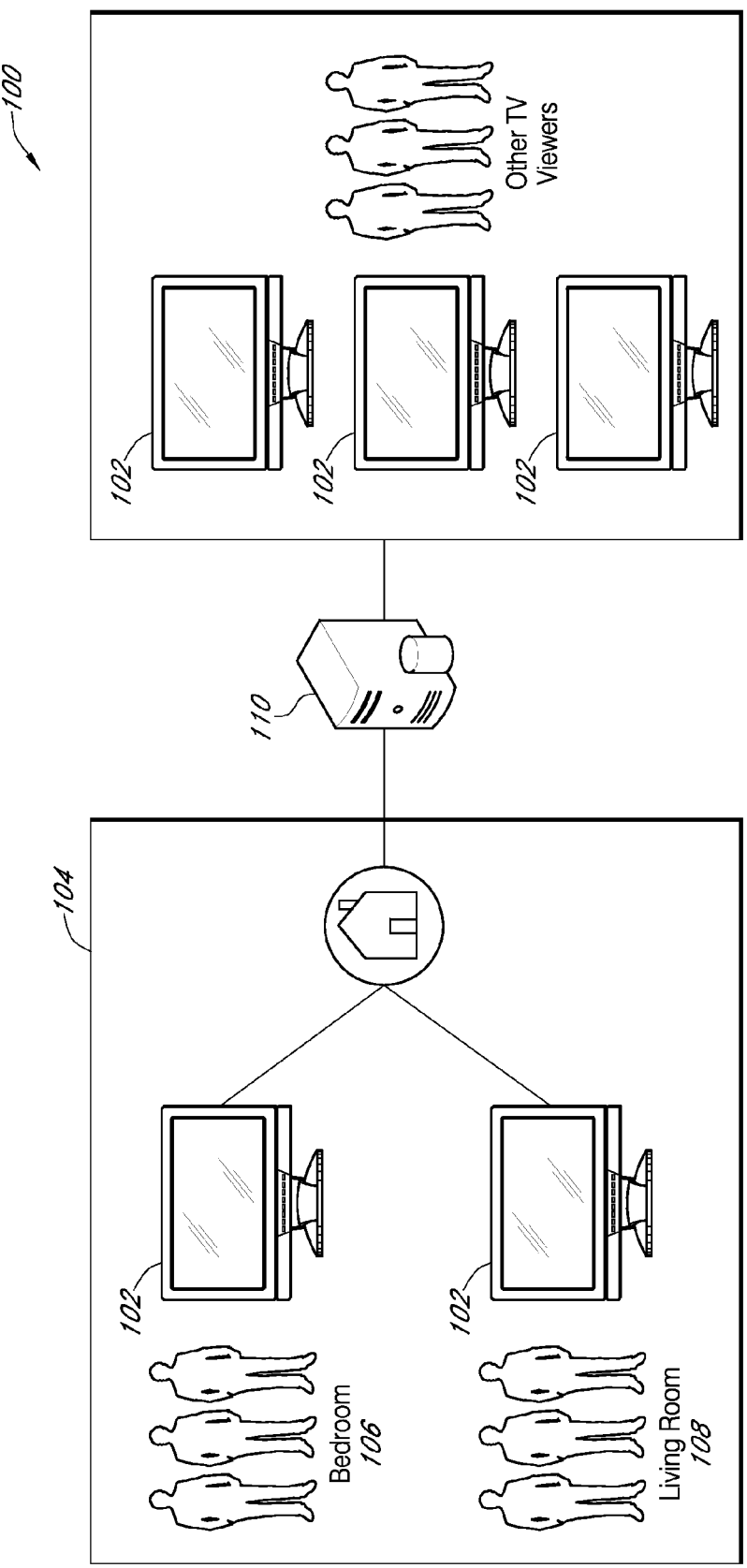
FIG. 1 is a schematic illustration of a system that includes a plurality of display devices that are distributed to a variety of different locations with at least one server that is communicatively linked to the plurality of display devices.

Reference will now be made to the drawings, wherein like numerals refer to like parts throughout. As shown in FIG. 1, the video display system 100 includes a plurality of individual display devices 102. These display devices 102 can include a plurality of known display devices such as television sets, including high definition television sets, computer displays or any other type of display that provides video content, either still or motion content, to users. The display devices 102 can be generally configured for use by a single user, for example as a laptop or desktop computer, a personal digital device, a cell phone/Smartphone, and the like. The display devices 102 can be configured for communal use by multiple viewers/users, for example as televisions, home theatre systems, video conferencing systems, and the like. The display devices 102 can be configured to interact with and display content from a wide variety of sources including but not limited to on air broadcasts, satellite communications, fiber optic or wired cable service, gaming consoles, Blu-Ray or other media players, downloads from a network such as the Internet, cellular networks, locally generated content, and the like.

As shown, these display devices 102 can be distributed in a single household 104 and can also be positioned in different locations within the household including in the bedroom 106 or the living room 108. The location of the display 102 is indicative of the environmental factors that may affect the manner in which the display 102 displays the video content to affect how a viewer or viewers perceive the content. For example, people who are watching television in a living room are generally sitting up and it is often daytime whereas people who are watching television in a bedroom may be more inclined to do so when lying down in bed when it is nighttime. The visual appearance of the content being displayed by the display 102 is affected by the environment, such as the ambient light, and is also affected by the relative position of the viewer with respect to the display. In some implementations, the display devices 102 are portable devices and would typically be used in a variety of locations, each having different environmental conditions.

As is also shown in FIG. 1, the system 100 includes a plurality of other display devices 102 that are used by other viewers in different environments. Feedback from those viewers may provide information from at least one application server 110 that will allow the server 110 to develop recommended display parameters for particular display content. Display content can, of course, comprise any of a number of different content, such as television shows, movies, sporting events and the like.

The display parameters can include a variety of different parameters that affect the manner in which the display devices 102 display the content. Exemplary display parameters can include parameters such as brightness, contrast, sharpness, color, tint, color temperature, gamma value, etc. Each of these parameters may substantially affect the quality of the display of the content by the display 102. Thus, the system 100 attempts to provide improved settings information to the displays 102 to thereby allow the displays 102 to automatically or dynamically reset the parameters to more desired parameter settings for that display 102, with reduced involvement by the viewers.

Figure 2:
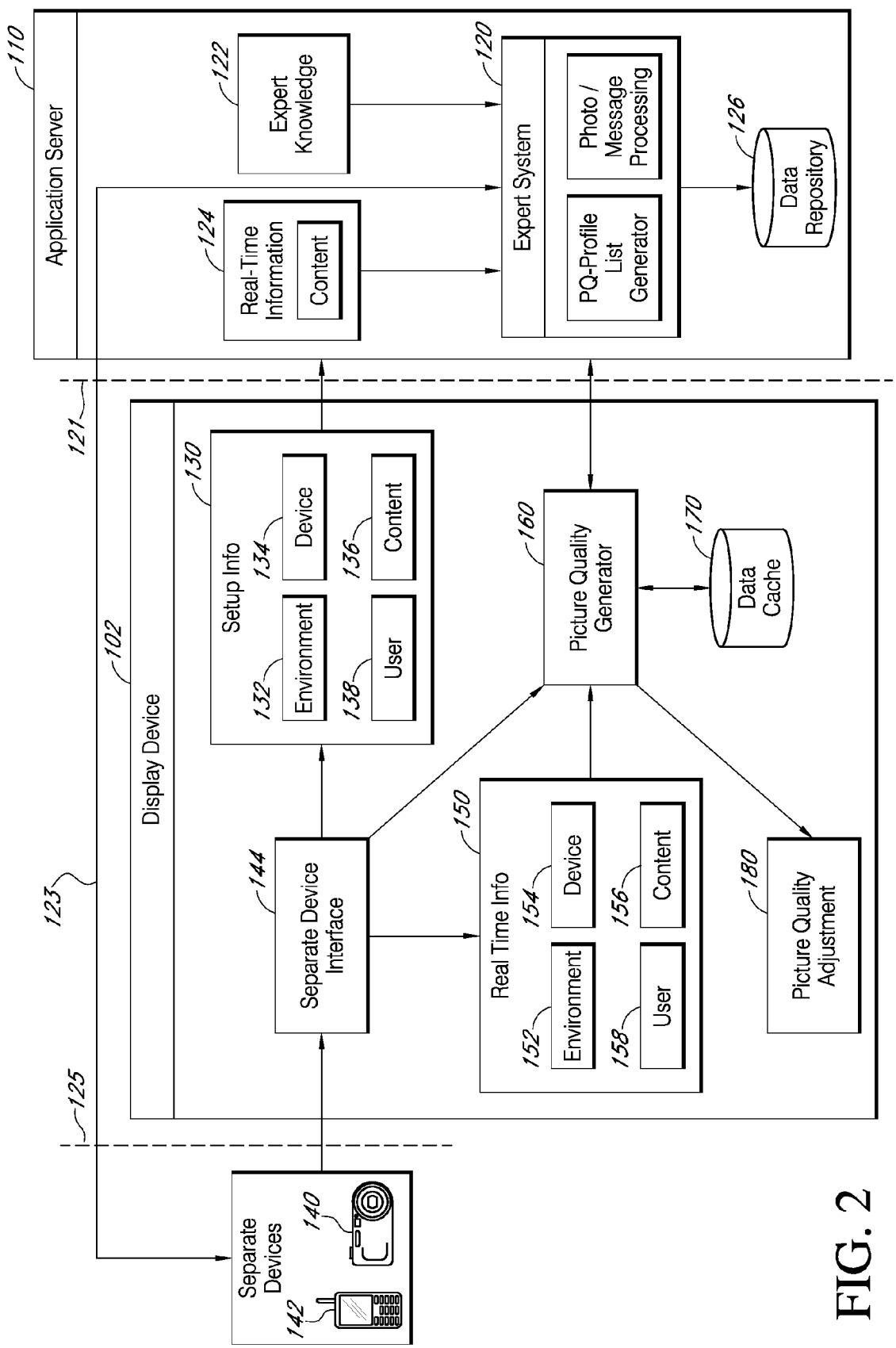
FIG. 2 is a functional block diagram illustration of one of a plurality of display devices and the at least one server of FIG. 1.

FIG. 2 is a functional block diagram that illustrates embodiments of functional components of one of the display devices 102 and the application server 110 of the system 100 in greater detail. As shown, the components of the system 100 on the server side can include an expert system 120 that receives information from an expert knowledge subsystem 122 and a real-time information system 124. The expert knowledge subsystem 122 is adapted to gather expert knowledge or suggestions on picture quality (PQ) settings. This information can be transmitted to and stored by the expert system 120 in the data repository 126. The desired parameters can be obtained from a variety of different sources or combination of sources.

For example, the producers of a particular video content may have desired parameters information for application to at least some of the display devices 102. Further, previous viewers of the content may also have input as to the desired parameters. Manufacturers of the display devices 102 may also have input as to the desired parameters for particular video content. All of these sources of information can be used to obtain a desired or recommended set of parameter settings for a particular video content which can then be stored by the expert system 120 in the data repository 126.

As is also shown, the expert system 120 can also receive information from the real-time information subsystem 124. The real-time information subsystem 124, in one implementation, collects electronic programming guide information from data partners who provide an indication of the content that is being provided via the system 100, e.g. the scheduling of shows, the types of shows, TV episode IDs, content genres, etc. In this way, the expert system 120 can match a set of initial parameters for each of the shows for subsequent download to the display devices 102 at the desired time.

The expert system 120 can either receive desired initial/revised parameters from other sources or can calculate picture quality adjustment values for various situations or contents. Further, as will be discussed below, the expert system 120 is also capable of updating a data cache associated with individual displays 102 on a periodic basis (e.g., weekly or daily). Further, the expert system 120 is also preferably configured to allow the individual display devices 102 to retrieve parameter settings or exchange parameter settings for particular video content in the manner that will be described below.

FIG. 2 also illustrates the functional components of an exemplary display device 102 that implements the display parameter process of the instant embodiment. As shown, the display device 102 includes a setup information subsystem 130 that collects the initial setup information and sends this information to the expert system 120 of the application server 110 via a communication link 121, such as the Internet or wireless communication. The setup information can include such things as the environment 132 in which the display device 102 is positioned. The environment 132 can include information such as the physical location of the display device 102 in a house, such as whether the display device 102 is in a living room or a bedroom, the distance the normal viewing area is from the display device 102 and the ambient light surrounding the display device 102, etc.

Information about the environment 132 can be automatically captured by one or more separate devices associated with the display 102, such as cameras and the like. The display device 102 can be equipped with or can be in communication with a camera 140 that records an image of the surrounding environment that can be transmitted to the setup information subsystem 130 via a separate device interface 144. This information can also be transmitted to the expert system 120 directly via a communications link 123 between the camera 140 and the expert system 120. The information can also be exchanged with the expert system 120 via the display device 102 and the communication link 121. In one implementation, the camera 140 takes an image when all the lights in a room are on or off. The pictures can then be analyzed using luminance matrix methods similar to camera matrix metering methods and luminance matrix values can then be recorded as input for assessing how to adjust the parameters of the display device to achieve the preferred parameter settings for the display device 102.

Alternatively or in addition, information about the environment can also be captured, such as via a cell phone 142 with a built-in camera. The viewer can take a photo of the display device 102 in its display environment and then transmit this information to the expert system 120 via the communication link 123 and a known messaging system such as Multimedia Messaging Service (MMS), e-mail, file-upload, and the like. The same luminance matrix method discussed above can be used to provide data indicative of the environment in which the display device 102 is positioned. Communication with the expert system 120 can be bi-directional in some embodiments. For example, the expert system 120 can receive data from the camera 140 and/or cell phone 142 and provide a return message confirming receipt of the new environmental data.

It will be appreciated that the camera 140 is generally integral with or located adjacent the display device 102 and is capturing an image of the viewing location of the viewers who will watch the display device 102, e.g. from the perspective of the display device 102. This image can provide information indicative of the distance the viewer is from the display device 102 and also provide data indicative of the ambient light characteristics surrounding the display device 102.

The cell phone 142 is, however, capturing an image of the display device 102 as it would be seen by the viewer. This provides different information with respect to the ambient environment in which the display device 102 is positioned as it is being shown from the point of view of the viewer. It will be appreciated that a variety of combinations of both the camera input 140 and the cell phone input 142 can be used to assess the ambient environment of the user. It will also be appreciated that other methods, such as evaluating the room information and/or using a photo cell can also be used to determine environmental characteristics of the location of the display device 102 without departing from the spirit of the present invention.

As is also indicated in FIG. 2, the setup information subsystem 130 also includes device information 134 about the display device 102. The device information can include information such as the display type, e.g., Plasma, LCD, etc., the screen size and the make and model number. This information can also be used by the expert system 120 to modify desired parameters for a particular display to match the device 102 of interest.

The setup information subsystem 130 can also include user information 138 about one or more users or viewers of the display device 102. It will be appreciated that various different users or viewers may have different preferences for both the type of content that is displayed and the manner in which it is displayed. During set up, preferences for particular individuals can be recorded and transmitted to the expert system 120, for example the real-time information module 124, so that the expert system 120 can use this information to update preferred initial display parameters that are then transmitted back to the display device 102.

The setup information subsystem 130 can also include content information 136. The content information 136 can include content that is prohibited on the display device 102 and can further comprise multiple service operator (MSO) information. It will be appreciated that a variety of different information can be captured by the display device 102 at set up, or subsequently throughout use of the display device 102, that can then be subsequently provided to the expert system 120 to permit the expert system 120 to provide preferred initial display parameters to the display 120 in a manner that takes into account both the environment in which the display device 102 is positioned and also the preferences of the viewers of the display device 102.

As is also shown in FIG. 2, the display device can also include a real-time information subsystem 150 that includes environment 152, device 154, content 156 and user 158 information that is substantially the same as the information that is contained within the setup information subsystem 130. In this functional subsystem, the real time ambient environment information is collected via the interface 144 from the camera 140, the cell phone 142 and/or any other environment sensor that can be used. In this way, the actual environmental conditions in which the display device 102 displays content can be used on a real time basis for adjusting the display parameters in the manner that will be described in greater detail below.

Similarly, the real-time subsystem 150 also makes note of dynamic device information 154 such as the current time that the display device 102 is being used as well as the current channel to which the display device 102 is tuned. The time and the channel can then be used to ascertain which preferred parameters should be used by the display 102 for a particular stream of content that is being displayed on the current channel at the current time.

Further, the real-time information subsystem 150 also includes current user or viewer information 158 that is indicative of which users or viewers are currently viewing the display 102. It will be appreciated that a remote control device can be used to indicate which of the current users are viewing the display 102 and the preferences of the current users can then be retrieved to obtain a desired set of parameters for the particular users or viewers. It will be appreciated that more than one user or viewer may be simultaneously logged in to the display device 102 such that the display device 102 may then have to either generate or retrieve a hybrid set of preferences for the particular combination of viewers or users.

The real-time information subsystem 150 can also capture current content information 156. The current content information 156 can include the current show or content that is being displayed by the display device as determined from a built-in or a set-top electronic program guide. This information can then be used to help determine a desired set of display parameters for the currently displayed content taking into consideration environmental factors, user preference factors, etc. as discussed above.

As is also shown in FIG. 2, the display device 102 can also include a picture quality generator 160 that receives information from both the real-time information subsystem 150 of the display device 102 and the expert system 120 of the application server 110. Preferably the picture quality generator 160 downloads initial display parameters from the expert system 120 via one or both of the communications links 121, 123. The information is initially downloaded based on the setup information that is provided to the expert system 120 via the setup information system 134.

The initial display parameters obtained by the picture quality generator 160 are stored by the picture quality generator 160 into a data cache 170 which acts like a cache of the expert system 120 in the display device 102. The data cache 170 provides a look-up table of data for the picture quality generator 160 that the picture quality generator 160 can use to determine final display parameters for the display of content based upon the information being received from the real-time information subsystem 150. The final display parameter values generated by the picture quality generator 160 can then be used for picture quality adjustment 180 and thus, the final display parameters, e.g., brightness, contrast, sharpness, color, tint, color temperature, gamma value, etc. can be dynamically modified to provide a better display of the content by the display device 102.

It will be appreciated that the system 100 provides the ability to modify the display parameters of the display 102 based on environmental factors, content being displayed, user preferences and downloaded preferences provided by the expert system 120. This modification of the display parameters can be accomplished with less input from the users or viewers and can thus work in the background of the display.

Figure 3:
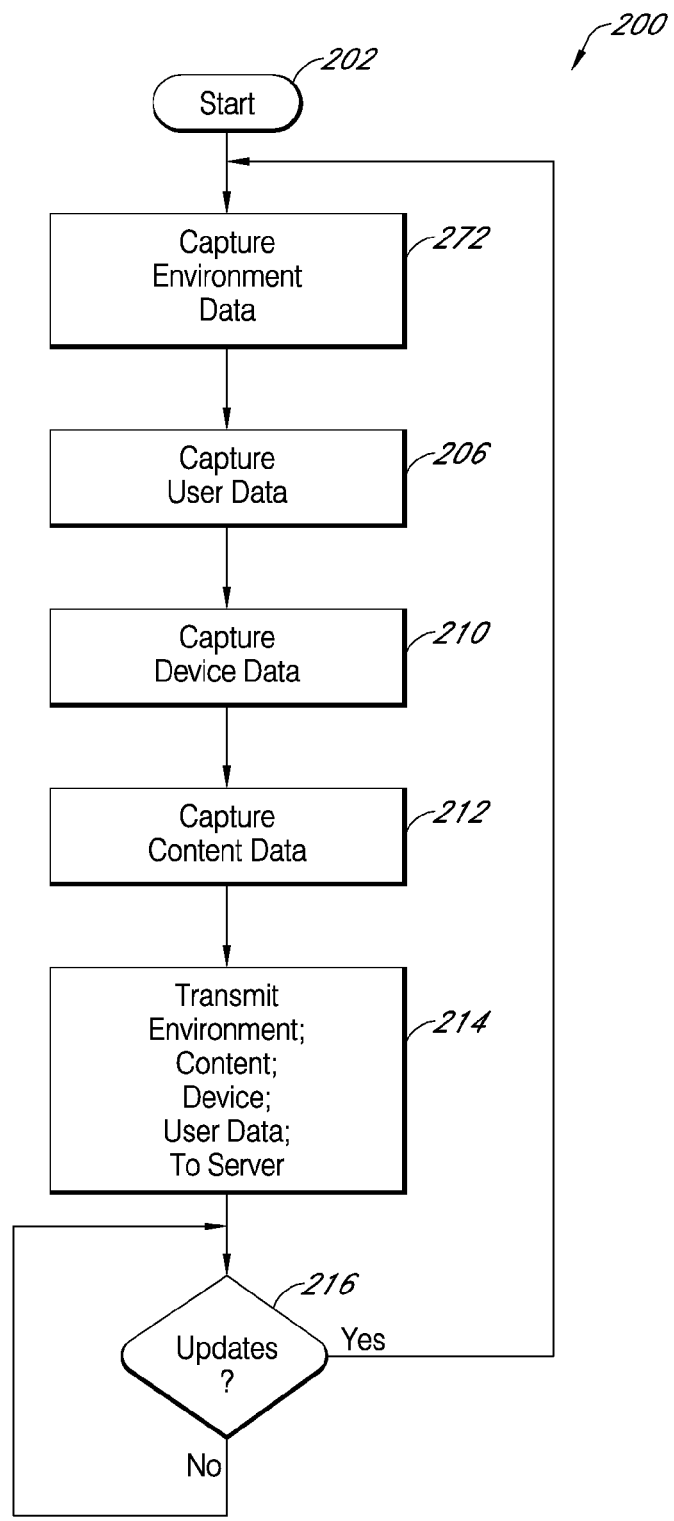
FIG. 3 is an exemplary flow chart illustrating how one of a plurality of display devices can be set up in a location and linked with at least one server.

Turning now to FIG. 3, a process whereby the setup information for the display device 102 is captured and provided to the server 110 is described. As discussed above, the setup information subsystem 130 of each of the display devices 102 captures setup information about a particular display device 102. This subsystem captures information about the environment in which the given device 102 is currently positioned in a block 204. As previously noted, the environment data can include ambient lighting, time of day, viewing distance, viewing orientation, etc.

Information about the user is gathered in a block 206. The user information can include a viewer's age, any vision impairments, name, account information, and the like. Information about the device is gathered in a block 210. The device data can include make and model of the display device 102, cumulative time of use, present display settings, and the like. Information about the content is gathered in a block 212. Content information can include a content source, content genre, audio levels, video feed parameters, age/content rating, resolution or definition, and the like.

This information can be captured automatically or it can be programmed into the subsystem by an installer of the display device 102 or even by the user of the display device 102. Once this information is captured, it is transmitted to the server in block 214.

The transmitted information initially provides a baseline of information for the server 110 to download initial display parameters to the display device 102 to allow the display device 102 the ability to adjust the initial display parameters based upon the real-time information and the suggested display parameters in the manner that will be described below in conjunction with FIG. 5. The baseline setup information can, of course, be updated when environmental factors, user preferences, device configuration or content changes. If the display device 102 determines that the setup information has changed in decision block 216, the subsystem 130 then recaptures this information, as indicated, and transmits the updated information to the server 102. The updated information can correspond only to changed data or to a complete set of setup data. Thus the system 100 can dynamically update based on real-time changes to iteratively adjust display settings for changes in viewer, content, environmental conditions, etc. throughout use of the device.

It will be understood that the blocks 204, 206, 210, 212 are illustrated in FIG. 3 in a particular sequence, however this is simply for ease of illustration and understanding. If performed sequentially, blocks 204, 206, 210, 212 can be performed in any possible order. In some embodiments, blocks 204, 206, 210, 212 can be performed in part or wholly in a parallel manner.

Figure 4:
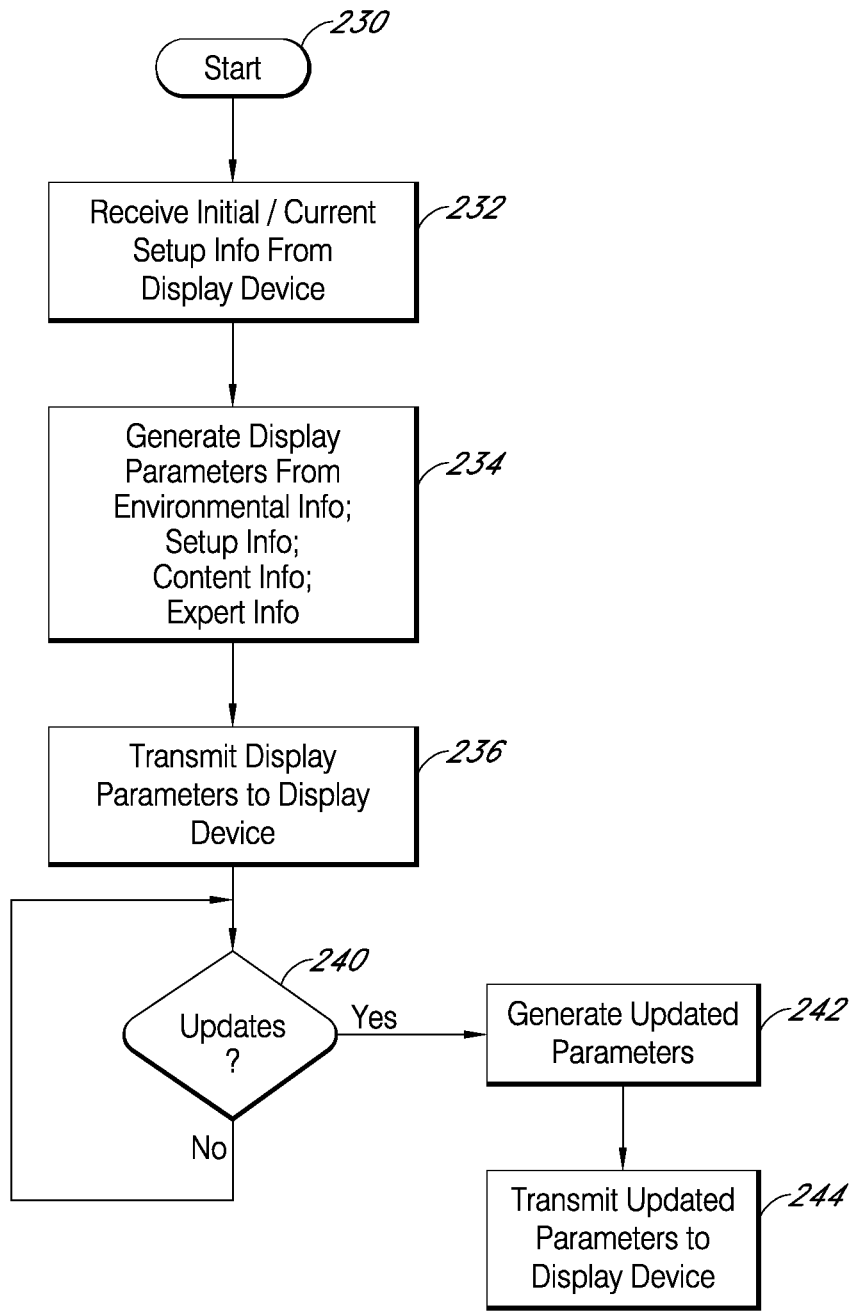
FIG. 4 is an exemplary flow chart illustrating how a server can generate initial display parameters and provide the initial display parameters to one or more display devices.

As shown in FIG. 4, the server 110, from a start block 230, receives the initial or current setup information transmitted from the display device in block 232. This information is then used, in conjunction with the real-time information module 124 (FIG. 2) and the expert knowledge 122 (FIG. 2) to determine initial/revised display parameters in block 234. The initial/revised display parameters, in one embodiment, comprise a look-up table of parameters that can be transmitted to the display device in block 236. The transmitted information can then be stored by the display device 102 and used to generate final display parameter settings based upon sensed real-time operating information of the display device 102 in the manner that will be described in greater detail below in conjunction with FIG. 5.

Transmission of the set of display parameters can be triggered by a request self-generated by the display device 102 and/or triggered by a request by a user. For example, a user can request via a cell phone 142 and communicate with the expert system 120 a desire to evaluate and possibly select an alternate set of parameter settings. The expert system 120 can communicate a new set or an ordered plurality of sets of display parameters either directly to the display device 102 via the communications link 121 or to the user's cell phone 142 via the communications link 123. The user can evaluate the different sets of display parameters using their cell phone and accept/reject/rate them accordingly. The user can then communicate directly with the display device 102 or with the expert system 120 and indicate a preferred set of display parameters/settings to be applied to the display device 102.

The information that is being received by the server 110 will, of course, be changing. The setup information for particular display devices 102 changes, the content that is being provided to the display devices 102 will change and the expert knowledge about the content will also be dynamically changing. Thus, the server 10 is periodically determining, in decision block 240, whether an update to any of this information has occurred and that an update is indicated in decision block 240. In some embodiments, a change need not necessarily trigger an update. For example, changes may need to exceed a certain threshold in number or magnitude to indicate that an update is indicated in block 240.

If an update is indicated, the server 110 determines updated initial parameters in block 242 and then transmits these updated initial parameters to the display device in block 244. This updating can occur continuously or the updating can occur periodically or aperiodically. It will be appreciated that new content may be developed continuously with continuous determination of factors that would affect the display parameters. However, it may be advantageous to limit transmission of any updated display parameters to the distributed display devices 102 to periodically, e.g., daily or weekly, due to bandwidth issues. Also, as previously noted, updates can be triggered aperiodically, for example arising from unpredictable changes in the viewing environment or acquisition of a new display device 102, for example.

In this way, the server 110 can continuously or intermittently determine proposed initial/revised display parameters based on current setup information, current content information, current environment information, current user information, and current expert information. This information can be continuously or periodically provided to the display device 102 so that the display device 102 can update current display parameters in a dynamic fashion without requiring substantial user input.

Figure 5:
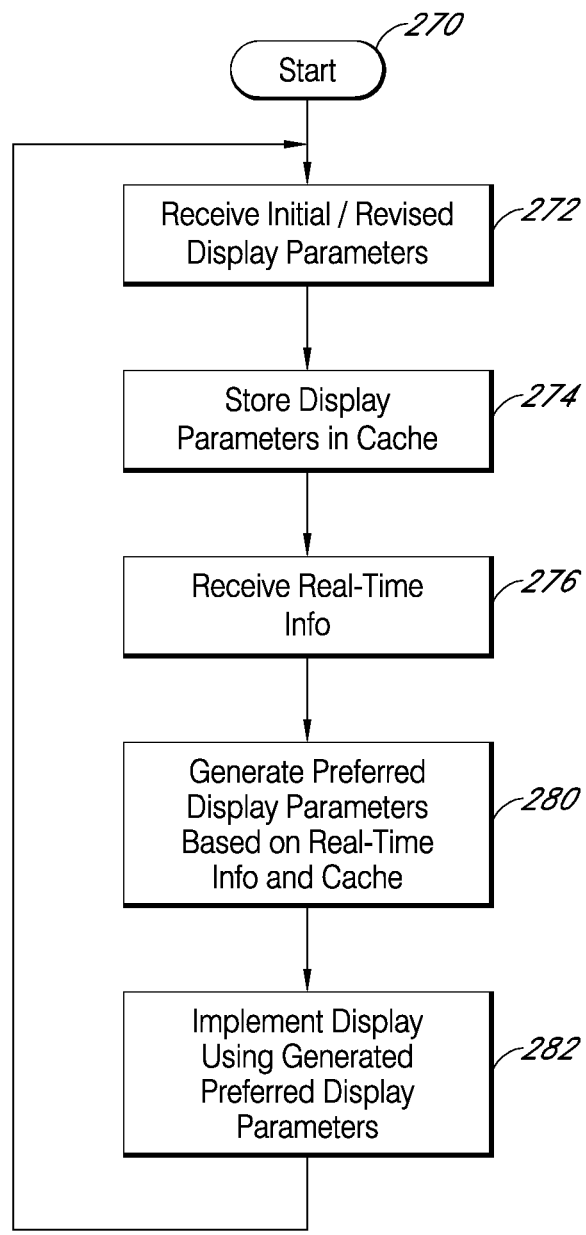
FIG. 5 is an exemplary flow chart illustrating how one of a plurality of display devices can use initial display parameters from at least one server along with real-time information from the display device and the local or viewing environment to implement final display parameters.

FIG. 5 is an exemplary flow chart that illustrate embodiments of how the display device 102 and, in particular, the picture quality generator 160 can determine final display parameters for particular content that is currently being displayed by the display device 102. As shown, from a start block 270, the picture quality generator 160 receives, in block 227, the initial display parameters, or updates thereto, from the expert system 120 via the communications interface 121 and/or via the communication interface 123 and one or more of the separate devices 140, 142.

In one implementation, the initial/revised display parameters are in the form of a look-up table that is accessible based upon the real-time information obtained by the real-time information subsystem 150. The picture quality generator 160 stores the initial display parameters into the data cache 170 or updates the previously stored initial display parameters in block 274.

When the display device 102 is operational, it can obtain a continuous stream of real-time information, in block 276, via the real-time information subsystem 150 and provide this information to the picture quality generator 160. This information can be indicative, for example, of the content that is currently being displayed, the user preferences, the environmental factors affecting the display device and information about the device 102 itself. This information is then used by the picture quality generator 160 to retrieve or calculate from the initial display parameters stored in the data cache 170 the final display parameters in block 280. The final display parameters can then be implemented in block 282 thereby changing the parameters of the display device 102, as indicated, via the picture quality adjustment 180.

Figure 6:
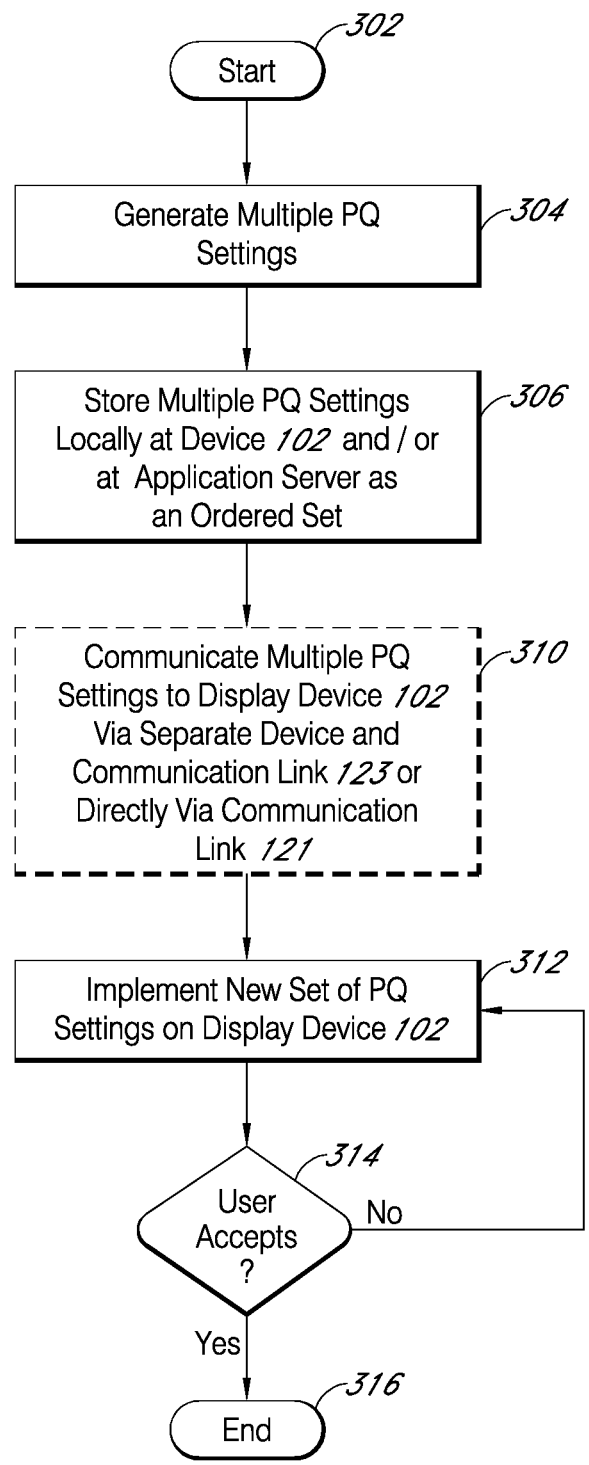
FIG. 6 is a flow chart of embodiments of generating and presenting multiple sets of picture quality settings and allowing user selection of a preferred set of settings.

FIG. 6 illustrates embodiments of a system and process for generating multiple sets of picture quality (PQ) settings and adjusting the display qualities of a display device 102 accordingly. One or more users can review the quality of image displayed according to one or more of the sets of multiple PQ settings and provide an indication of a preferred set of the settings. It will be understood that the number of different display parameters that can be adjusted and the range of adjustments of these parameters can result in a large number of combinations of particular display parameter settings. In addition, in at least some applications, a plurality of different viewers or users may wish to view a given display device 102 at a given time. Thus, in at least some applications, selection of a single set of PQ settings may be suboptimal for a particular individual viewer or user, however by presenting multiple options, a group of viewers can select a particular set of PQ settings that provide an improved viewing experience for the group.

A start block 302 indicates generally operation of the system 100 and associated processes as previously described. In a block 304, multiple PQ settings sets are generated generally to correspond to different combinations of environment data, user data, device data, and content data. For example, a first PQ settings set may be optimized for a first user of the device 102 and a second PQ settings set can be optimized for a second user of the display device 102. In a similar manner, a given PQ settings set can be optimized for a particular device 102, particular content, and/or a particular set of environmental conditions. Implementation of block 304 can occur locally, e.g., at the display device 102 itself and/or remotely, e.g., at the application server 110.

In a block 306, the multiple PQ settings set generated in block 304 are stored. The storage of block 306 can similarly occur locally at the display device 102, for example in the data cache 170 or other local storage. The storage of block 306 can also occur in some embodiments in addition or as an alternative remotely at the application server 110. The storage of block 306 can be performed such that the multiple PQ settings sets are arranged as an ordered set.

In an optional block 310, multiple PQ settings sets can be communicated to the display device 102. For example, in embodiments where the multiple PQ settings sets are not stored locally at the display device, the block 310 provides the capability to communicate this data to the display device 102. In some embodiments, block 310 operates to communicate the multiple PQ settings sets to the display device 102 via the combination of a separate device 142 and the communication link 123. For example, in some embodiments a user can receive and evaluate one or more sets of display settings on their cell phone 142. In some embodiments, block 310 operates to communicate the multiple PQ settings sets to the display device 102 directly via the communications link 121.

In a block 312, at least one set of the PQ settings is implemented at the display device 102 and/or the user's cell phone 142. The display device 102 can adjust display of the corresponding content according to the implemented set of PQ settings. In a block 314, a decision is made whether or not the user accepts the set of PQ settings implemented in block 312. A user can indicate acceptance via actuation of a local user input control associated with the display device 102 or via communication with the display device 102, for example with a separate device comprising a cell phone 142. If the user indicates acceptance in block 314, an end block 316 is implemented that corresponds generally to continued operation of the system 100 and associated processes as described herein.

After a determined time-out period or via affirmative indication by the user that the currently implemented set of PQ settings from block 312 is not acceptable, blocks 312 and 314 are iteratively implemented until user acceptance is indicated in an iteration of block 314. It will be understood that should a user fail to indicate acceptance in block 314, a time-out or count-out provision can be implemented to accept one of the set of PQ settings absent affirmative user acceptance.

Thus, the integrated system 100 can continuously determine a variety of factors affecting the display device 102 that affect picture quality and also provide expert information about the content to the display devices 102 so that the display devices 102 can dynamically adjust one or more of a variety of the display parameters affecting picture quality. This process is ongoing and does not require continuous intervention on the part of the user or viewer.

Although the foregoing description has shown, described and illustrated the present invention, it will be appreciated that various changes and modifications to the system and the uses thereof may be made by those skilled in the art without departing from the teachings of the present invention. Thus, the scope of the present invention should not be limited to the foregoing discussion but should be defined by the appended claims.

What is claimed is:

1. A system for displaying graphic content via one or more display devices, the system comprising:
    at least one server that is communicatively linked to at least one display device of the one or more display devices, wherein the at least one server receives one or more images for performing analysis, wherein the at least one server provides initial display parameters to the at least one display device;
    at least one sensor device arranged to obtain real-time information concerning environmental factors; and
    one or more picture quality generators that are each respectively coupled with one of the one or more display devices;
    an environmental monitor associated with each of the one or more display devices that measures environmental factors and provides the measured environmental factors and the one or more images to at least one of the at least one server and the picture quality generator, wherein the environmental monitor includes a camera and the one or more images are captured by the environmental monitor, wherein the camera provides an image of an area from which the at least one of the one or more display devices is viewed;
    wherein each picture quality generator is configured to:
    receive the initial display parameters for the respectively coupled display device; and
    generate final display parameters for said respectively coupled display device based upon the initial display parameters and inputs received in real time from the at least one sensor device for adjusting the initial display parameters, wherein said inputs comprise dynamic factors affecting said respectively coupled display device, and wherein said respectively coupled display device displays graphic content according to the final display parameters generated.

2. The system of claim 1,
    wherein each picture quality generator is further configured to generate final display parameters for said respectively coupled display device based upon initial display parameters for said respectively coupled display device, inputs received in real time from the at least one sensor device, measured environmental factors for said respectively coupled display device, and user preferences.

3. The system of claim 2,
    wherein the one or more images comprise a current environment of at least one of the one or more display devices, wherein the environmental monitor transmits the one or more images to one or more of the at least one server and the picture generator for analysis.

4. The system of claim 3, wherein the environmental monitor includes a cell phone camera that provides images of the at least one of the one or more display devices to the at least one server.

5. The system of claim 1, wherein each picture quality generator dynamically adjusts the final display parameters in real time based on real-time information provided by the at least one sensor device.

6. The system of claim 5, wherein:
    the at least one sensor device provides a continuous stream of real-time information; and
    in response to information received from the at least one sensor device, each picture quality generator periodically adjusts the final display parameters when said parameters exceed a predetermined threshold.

7. The system of claim 5, wherein:
    the at least one sensor device provides a continuous stream of real-time information; and
    in response to information received from the at least one sensor device, each picture quality generator iteratively adjusts the final display parameters as new information is provided in real time.

8. The system of claim 1, wherein:
    the at least one sensor device comprises a first sensor device located at an associated display and a second sensor device arranged to observe said associated display device;
    wherein each picture quality generator receives inputs from the first sensor device and the second sensor device, and generates the final display parameters based upon the initial display parameters and inputs received in real time from the first sensor device and the second sensor device.

9. The system of claim 1, wherein:
    the initial display parameters comprises a look-up table.

10. The system of claim 1, wherein:
    the at least one server collects information from a plurality of sources, and generates expert knowledge relating to display parameters for the at least one display device;
    wherein the information collected comprises one or more of the following: device information relating to the at least one display device, user information, content information, and information relating to the environment of relating at least one display device; and
    wherein each picture quality generator is further configured to generate final display parameters for the respective display device using initial display parameters for said respective display device, and adjusting the initial display parameters with inputs received in real time from the at least one sensor device, and expert knowledge for said respective display device.

11. The method of claim 1, wherein the environmental factors comprise physical location information for the one or more display devices within a structure, and lighting information surrounding one or more display devices.

12. The method of claim 11, wherein the environmental factors further comprise viewing distance and viewing location within a particular room.

13. A system for displaying graphic content, the system comprising:
- a server having access to data indicative of selected graphic content to be displayed on one or more display devices that are communicatively linked with the server, wherein the server is configured to:
  - receive one or more images for performing analysis;
  - generate initial display parameters based, at least in part, upon the selected graphic content and the analysis; and
  - provide the initial display parameters to the one or more display devices;
- wherein the one or more display devices include a picture quality generator for generating a final set of display parameters based upon using the initial display parameters provided by the server and adjusting the initial display parameters using input from an environment monitor that obtains real-time information concerning environmental factors;
- wherein the one or more display devices adjust display settings in real time based on the final set of display parameters for display of the selected graphic content; and
- wherein the one or more display devices include an environmental monitor that measures environmental factors and provides the measured environmental factors and the one or more images to at least one of the server and a particular picture quality generator for one of the display devices, wherein the environmental monitor includes a camera and the one or more images are captured by the environmental monitor and transmitted to the server, wherein the camera provides an image of an area from which the at least one of the one or more display devices is viewed.

14. The system of claim 13, wherein the one or more display devices further generate the final set of display parameters based on using the initial display parameters, and adjusting the initial display parameters with the input from the environment monitor, and user preferences.

15. A method of displaying graphic content via a display device, the method comprising:
- developing initial display parameters tailored for selected graphic content, wherein the initial display parameters are generated using one or more images used for performing an analysis;
- providing the initial display parameters to the display device;
- automatically monitoring an environment in which the display device is currently positioned;
- automatically calculating final display parameters using a picture quality generator of the display device, wherein the display device calculates the final display parameters based upon using the initial display parameters, and adjusting the initial display parameters using environmental factors of the monitored environment;
- automatically implementing the final display parameters on the display device;
- displaying the graphic content according to the final display parameters;
- measuring environmental factors using an environmental monitor associated with each of the one or more display devices that measures environmental factors; and
- providing the measured environmental factors and the one or more images by the environmental monitor to at least one of a server and the picture quality generator, wherein the environmental monitor includes a camera and the one or more images are captured by the environmental monitor, wherein the camera provides an image of an area from which the at least one of the one or more display devices is viewed.

16. The method of claim 15, further comprising:
capturing initial setup information about the display device, wherein developing initial display parameters tailored for specific graphic content further comprises developing the initial display parameters based on the initial setup information.

17. The method of claim 16, wherein capturing initial setup information comprises capturing information about the display device, the environment in which the display device is used and user preferences.

18. The method of claim 17, wherein capturing initial setup information further comprises capturing information from one or more content producers.

19. The method of claim 15, wherein monitoring the environment in which the display device is used comprises monitoring lighting in the environment in which the display is positioned.

20. The method of claim 15, wherein automatically calculating final display parameters further comprises hybridizing different user preferences.

21. A system for displaying graphic content on a display device in network of devices, the system comprising:
- at least one server configured to enable communication with a plurality of display devices;
- the server configured to receive input from a plurality of sources associated with the plurality of display devices, the input comprising one or more images and at least one of initial display parameters and dynamic factors pertaining to the plurality of display devices; and
- the server including an expert system for at least one of generating and storing said initial display parameters and dynamic factors pertaining to the plurality of display devices and performing analysis on the one or more images, and generating or storing picture quality adjustment information relevant to at least some of the display devices or various combinations thereof; and
- the server configured to output information associated with the expert system, said information suitable to enable said display devices to adjust the information to generate final display parameters for displaying graphic content using a respective picture quality generator of each display,
- wherein the plurality of display devices each include an environmental monitor that measures environmental factors and provides the measured environmental factors and the one or more images to at least one of the server and a particular picture quality generator for one of the plurality of display devices, wherein the environmental monitor includes a camera and the one or more images are captured by the environmental monitor and transmitted to the server, wherein the camera provides an image of an area from which the at least one of the one or more display devices is viewed.

22. The system of claim 21 wherein the server is configured to receive said input from said plurality of sources associated with said plurality of display devices comprises receiving said input in real time.

23. The system of claim 22 wherein the server is configured to update information in the expert system in real time based on the received inputs.

24. The system of claim 22 wherein the server is configured to update information in the expert system based on changes in the real time input in one of continuously, periodically, aperiodically, and in response to predetermined thresholds.

25. The system of claim 21 wherein the server is configured to receive said input from said plurality of sources associated with said plurality of display devices comprises receiving said input from a portable sensor device.

26. The system of claim 25 wherein the portable sensor device comprises a mobile telephone.

27. The system of claim 21 wherein the server is configured to receive said input from a first sensor arranged on a first display device and a second sensor arranged to provide image data concerning a viewing area proximal to the display as viewed from a viewer's point of view.

28. The system of claim 27 wherein said first sensor and said second sensor are arranged to obtain image measurements when no lights are on in the room where the first display device is located, capture the one or more images, analyze the one or more images captured using the said first sensor and said second sensor, and then using luminance matrix methodologies analysis and processing to provide a baseline for adjustments in display parameters to implement for determining the final display parameters for the display devices.

29. The system of claim 28 wherein the second sensor comprises a cell phone used for capturing one or more images.

30. The system of claim 21 wherein the server receives said content input and user input associated with a display, and the expert system integrates the received user preferences concerning display parameter preferences with content based parameters to generate user profiles expressing a desired user preference associated with selected user preferred content.

31. The system of claim 21 wherein the server receives said input from a plurality of sources associated with the plurality of display devices, the input comprising at least one of initial display parameters and dynamic factors pertaining to the plurality of display devices includes at least one of environmental factors, user preferences, content information, and display device information.

32. The system of claim 31 wherein the server is configured to dynamically update information in the expert system based on changes in said real time information enabling iterative adjustment of the display settings for the plurality of displays.

33. The system of claim 32 wherein the server is further configured to obtain input associated with a first display and a second display.

34. The system of claim 33 wherein at least one of the first display and the second display comprise a portable display devices.

35. The system of claim 32, wherein input received by the server concerning user preferences for the first display is applied to the second display.

36. The system of claim 32 wherein different user preferences received by the server integrated together to generate hybrid user preferences.

* * * * *